April 10, 1945.   W. J. COULTAS ET AL   2,373,169
ELEVATOR
Filed July 4, 1942   3 Sheets-Sheet 1

INVENTORS
Wilbur J. Coultas
Ellsworth T. Johnson & Jesse A. Walker
BY
ATTORNEYS

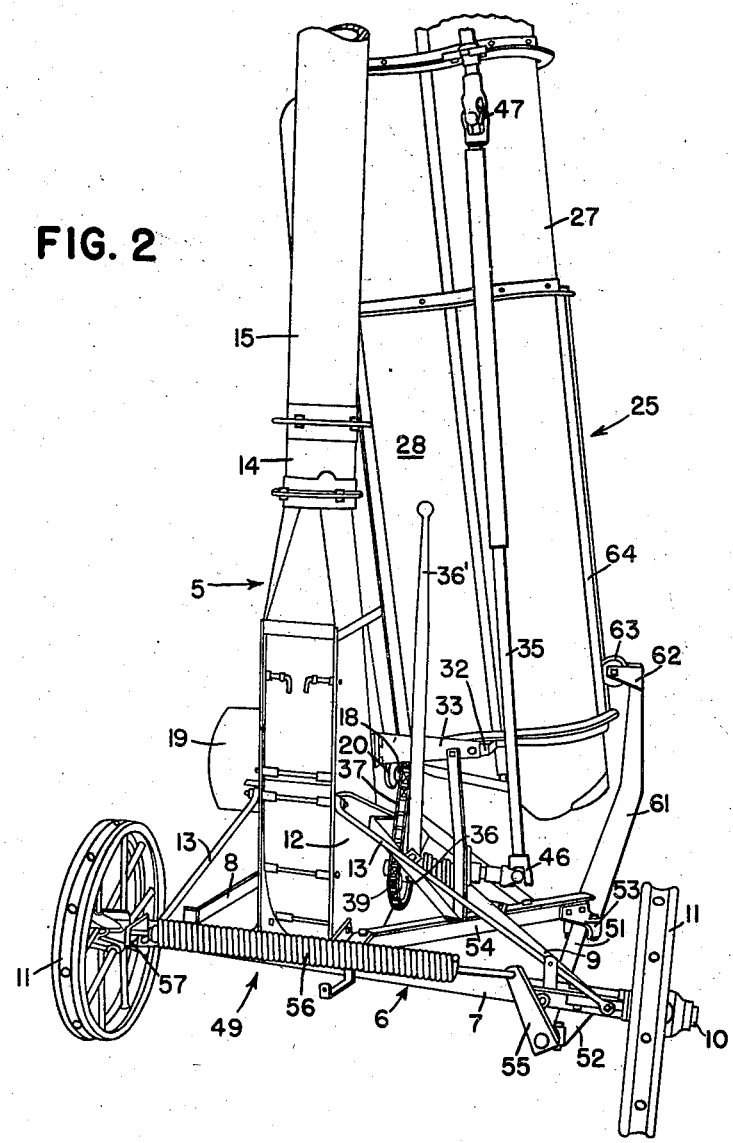

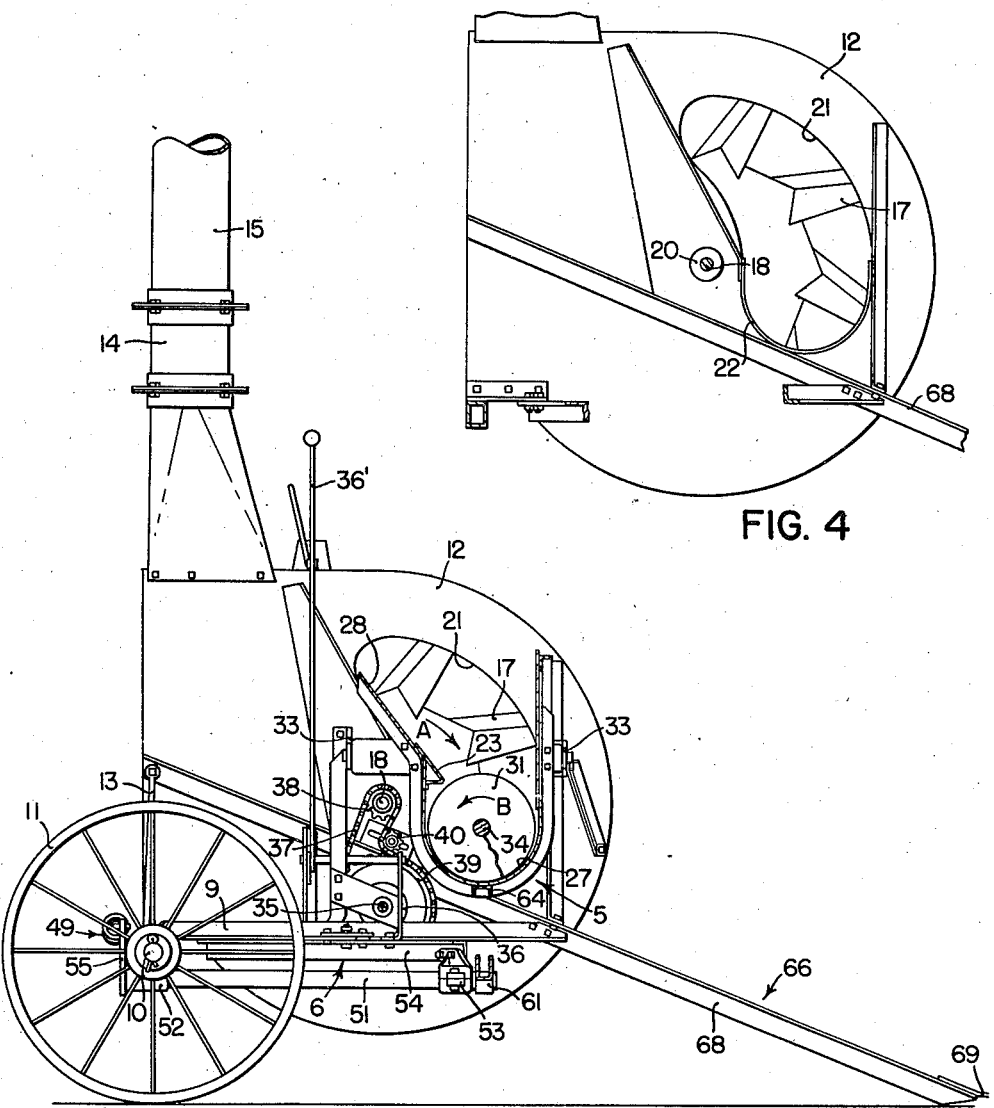

Patented Apr. 10, 1945

2,373,169

UNITED STATES PATENT OFFICE 2,373,169

ELEVATOR

Wilbur J. Coultas and Ellsworth T. Johnson, Moline, and Jesse A. Walker, East Moline, Ill., assignors to Deere & Company, Moline, Ill., a corporation of Illinois Application July 4, 1942, Serial No. 449,812

14 Claims. (Cl. 302—37)

The present invention relates generally to machines for filling silos and other storage buildings with desired material and more particularly to silo fillers of the blower type.

One of the primary objects of my invention is to provide a blower with an auger type feeder, with provision for mounting the auger feeder on the blower so that the feeder may be swung up alongside the blower to permit a wagon to be driven into unloading position beside the blower.

A further object of my invention is to provide a drive mechanism for the auger conveyor, which is so arranged as to accommodate swinging the auger upwardly into a substantially vertical position.

Another object is to provide a feeding mechanism that cooperates with the blower so that the material that is fed into the blower is received more efficiently and thus increases the output of the entire machine.

Other objects and advantages of the present invention will become apparent to those skilled in the art after a consideration of the following detailed description of the preferred embodiment thereof, reference being had to the accompanying drawings, in which Figure 1 is a perspective view of the implement showing the conveyor in position to receive material to be elevated into a silo by the blower;

Figure 2 is a perspective view of the implement showing the position of the conveyor when it is folded upwardly alongside of the blower for transport;

Figure 3 is a side elevational view with the material conveyor partly in section; and Figure 4 is a side elevational view of the blower housing with the conveyor and drive connections removed, to more clearly show the shape of the feed opening.

Figure 1:
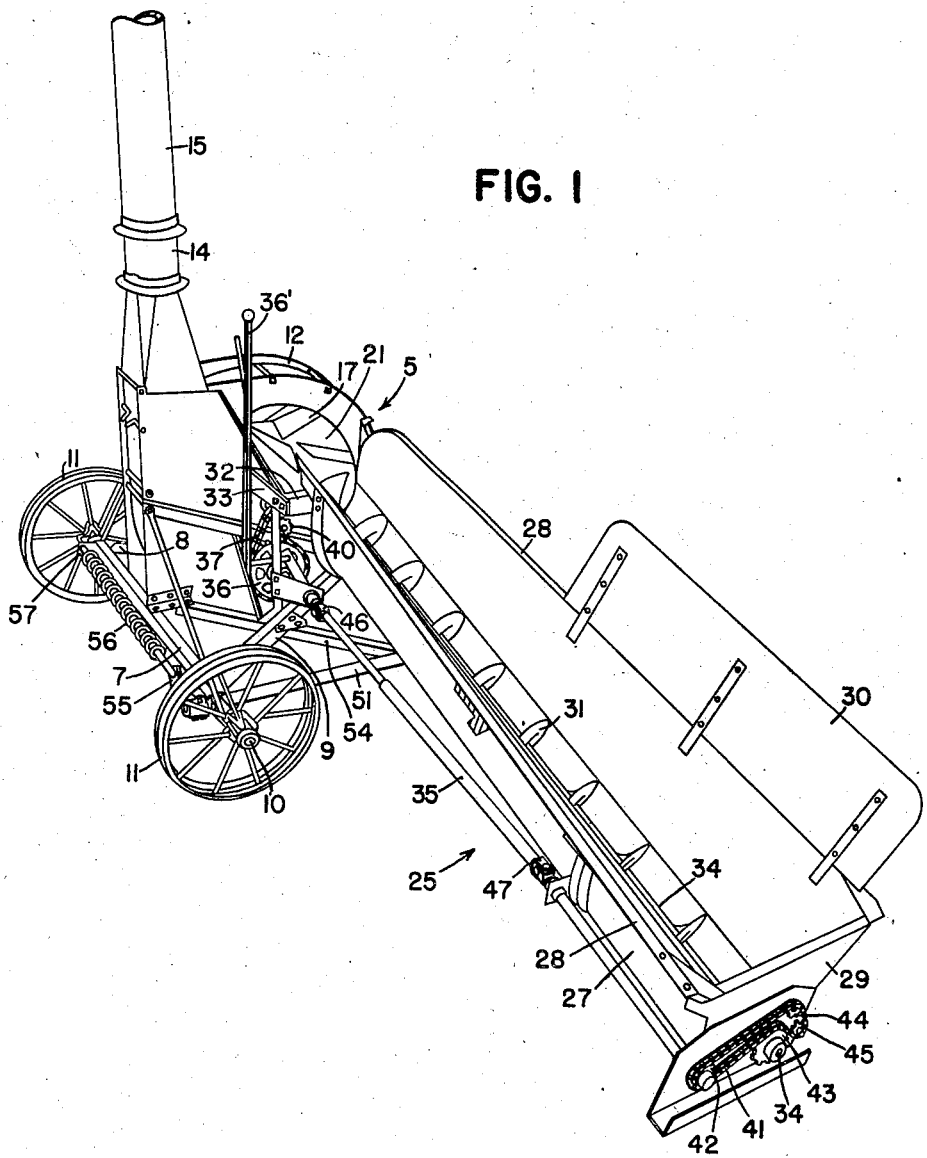

Referring now to the drawings wherein similar reference characters designate corresponding parts through the several views, the numeral 5 indicates in its entirety my improved crop blower, which includes a main supporting frame 6 preferably fabricated from angle iron or like structural material. The frame 6 includes a rear transverse angle bar 7 and forwardly converging side bars 8 and 9. Wheel axles 10 are bolted or otherwise secured to the opposite ends of angle bar 7 and on which are rotatably mounted ground wheels 11. Rigidly mounted within the frame 6 is a blower housing 12, which is braced by upwardly converging members 13 secured to opposite sides of the housing and to the angle bar 7. The blower housing 12 is provided with a tangentially extending outlet 14, to which is connected the blower pipe 15 for conveying material to a silo or the like. A conventional blower wheel or rotor 17 is fixed on a drive shaft 18, which extends through the axial center of the blower housing 12. The shaft 18 is supported in bearings 20 secured to each side sheet of housing 12. A belt pulley 19 (see Figure 2) is keyed on one end of shaft 18 and is adapted to engage a drive belt drivingly connected with a power plant of any desired type. In the present instance, the blower wheel 17 is driven in a clockwise direction as indicated by the arrow A shown in Figure 3. A kidney-shaped intake opening 21 is formed in the side sheet of the blower housing 12 at the side of the machine opposite the pulley 19. The opening 21 is located at one side of the axial center of the housing and curves upwardly and laterally from a semi-circular rim 22 below the horizontal plane of the blower shaft to a curved end directly above or slightly beyond the axis of the blower shaft.

A feed conveyor 25 is hingedly mounted on the frame 6 and extends laterally outwardly therefrom. The inner end of the conveyor 25 is disposed adjacent the intake opening 21 to deliver the material into the blower housing 12.

The conveyor 25 comprises a generally hemicylindrical trough member 27 formed preferably from sheet metal and having upper flared sides 28 and an end wall 29. The inner end of the trough member registers with the rim 22 on the edge of the intake opening 21. A backboard 30 is provided on one of the flared sides 28 adjacent the outer end thereof to direct material into the conveyor. An auger 31 fits into the rounded contour in the bottom of the trough 27 and has a shaft 34, which is supported at its outer end in a bearing (not shown) carried in the end wall 29. The inner end of the auger 31 floats in the trough 27 and bears on the edge of the auger blade, so that the end of the trough adjacent the feed opening is unobstructed by bearing members. A stripper 23 extends the length of the trough and overhangs the auger 31, forming a continuation of the plane of the inclined side wall 28. The stripper is spaced slightly above the auger to permit the latter to rise if a stalk should intrude under the blade, but limits the upward movement of the auger. The stripper also prevents a pile of material from feeding too fast into the auger trough.

A hinge trunnion 32 extends laterally outwardly from each side of the conveyor trough 27 adjacent the inner end thereof and these trunnions are pivotally supported in brackets 33 fixed on the blower housing 12 and extending outwardly therefrom. The brackets 33 extend outwardly beyond the housing 12 far enough to permit the flared sides 28 of the conveyor to clear the housing when the conveyor is raised into a vertical position. The auger 31 is driven from its outer end in a counterclockwise direction, as indicated by the arrow B in Figure 3 through a telescoping extensible power shaft 35 supported alongside the conveyor trough 27. The inner end of the power shaft 35 is drivingly connected with a clutch 36 supported on the blower housing 12. The clutch 36 is driven from the shaft 18 through a drive chain 37, which is trained over a sprocket 38 on the shaft 18 and a sprocket 39 on the clutch 36. An idler sprocket 40 provides the proper tension on the chain 37. The outer end of the power shaft 35 is connected with the auger 31 through a drive chain 41 which is trained over a sprocket 42 on the shaft 35, a sprocket 43 on the auger shaft 34, and idler sprockets 44 and 45. The clutch 36 is controlled by a hand lever 36' for stopping the feed auger during operation, when necessary.

As previously stated, the feed conveyor 25 is hingedly mounted on the frame 6 to permit it to be swung upwardly into a substantially vertical position alongside the blower housing. This is done to prepare the implement for transport or to provide for the passage of a wagon or like vehicle into position adjacent the elevating blower housing. Universal joints 46 and 47 are provided in the power shaft 35 to permit it to fold upwardly with the conveyor 25.

To facilitate raising the conveyor 25, a counterbalancing mechanism 49 is provided. The counterbalancing mechanism 49 comprises a longitudinal rockshaft 51 supported at its rear end in a bearing 52 mounted on the transverse frame bar 7 and at its front end in a bearing 53 secured on the end of a diagonal angle bar 54 which is supported on the frame bars 7 and 9. The rear end of the rockshaft 51 extends rearwardly beyond the bearing 52 and an upwardly extending arm 55 is rigidly secured thereon. A tension spring 56 is provided between the upper end of arm 55 and a bracket 57, which is secured to the opposite end of angle bar 7. A lifting arm 61 is secured on the forward end of rockshaft 51 and extends laterally outwardly below the conveyor 25. An upwardly extending bracket 62 is fixed on the outer end of arm 61 which supports a roller 63 positioned to engage a channel track 64, which is secured on the lower face of the conveyor trough 27. The roller 63 is held in contact with the track 64 by the action of the spring 56 tending to rotate the rockshaft 51 and urging the arm 61 upwardly.

The material that is deposited in the conveyor 25 is moved to the blower 12 by the auger 31 and is delivered into the blower through the opening 21. It has been found in practice that the material is not always deposited in the conveyor 25 at an even or uniform rate. Frequently, heavy charges of material are followed by very light charges. Both heavy and light charges of material are efficiently fed into the blower, due to the shape of the opening and the relative direction of rotation of the blower and auger. As viewed in Figure 3, the counterclockwise rotation of the auger tends to pile up the material toward the left, but the opening 21 curves in that direction and thus receives the entire charge without restriction. We have found that the material is thus fed at a greater rate without clogging than when a clockwise rotating auger is used, for the latter tends to crowd the material down to the bottom of the opening, and the clockwise rotating blower acts in the same manner, with the result that only the lower end of the opening is effective in receiving material. Therefore, the auger which rotates opposite to the blower, together with the kidney-shaped opening, is the combination which has been found to feed material at the greatest rate. This shape of opening requires the smallest area for a given capacity, thereby preventing too large a flow of air into the blower, which would reduce its material conveying capacity. Furthermore, eliminating the inner bearing removes the restriction from the feed opening.

In the operation of the implement, when a load of silage or other material to be loaded into the silo or other storage building is brought up to the crop blower, the conveyor 25 is raised to a vertical position alongside the blower housing to allow the vehicle to drive in place beside the blower. The conveyor 25 is then lowered behind the wagon or truck and the load moved into the conveyor. This arrangement eliminates the necessity of backing the wagon or truck into position for unloading.

When transporting the implement, the conveyor 25 is raised into a vertical position to enable the implement to clear the usual farm gate. The implement is transported by means of a draft frame 66 which comprises converging draft bars 67 and 68 secured at their rear ends to the blower housing and at their forward ends to a clevis plate 69. The tractor or other power means is connected to the plate 69 in the usual manner to move the implement from place to place.

Although a specific embodiment of the invention has been illustrated and described, it will be understood that various alterations in the details of construction may be made without departing from the scope of the invention, as indicated by the appended claims.

We claim:

1. An implement of the class described, comprising a housing, a blower wheel within said housing and rotating in one direction, said housing having a feed opening in one side wall at one side of the axis of said wheel and extending upwardly and laterally to a position above the axis of said wheel, and a feed conveyor including an auger positioned adjacent the lower end of said feed opening and rotating in a direction opposite to the direction of rotation of said blower wheel.

2. An implement of the class described, comprising a housing, a blower wheel within said housing, said housing having a generally kidney-shaped feed opening in one side wall at one side of the axis of said wheel, said opening curving about the axis of the blower wheel shaft from below the horizontal plane of the latter to a point directly above said axis, a feed auger positioned to deliver material into the lower portion of said feed opening, and means for rotating said auger in the direction of upward curvature of said opening.

3. An implement for elevating silage and like material, comprising a blower and a feed conveyor for receiving material and delivering it to said blower, said feed conveyor comprising a trough mounted on said blower and extending outwardly laterally therefrom, an auger in said trough, said auger supported at its outer end in a bearing carried in the outer end of said trough, the inner end of said auger resting in said trough and supported therein on the edge of the auger blade, said auger being adapted for a limited amount of upward movement relative to said trough as the auger is displaced upwardly by material in said trough, and a stripper fixed along one side of said trough and overhanging said auger, to cooperate with the latter in feeding the material and to limit the upward movement of said auger.

4. An implement for elevating silage and like material, comprising a power-driven elevating unit, a feed conveyor pivotally mounted on said elevating unit for receiving material to be elevated and delivering it to said elevating unit, said conveyor comprising a trough, hinge means for connecting said trough to said elevating unit, an auger in said trough, said auger supported at its outer end in a bearing carried in the outer end of said trough, the inner end of said auger resting in said trough, a power shaft for driving the auger extending longitudinally of, and mounted on said trough, the outer end of said power shaft being connected with the outer end of said auger and the inner end flexibly connected with said power-driven unit, and counterbalancing means on said unit comprising a rockshaft disposed beneath said trough and generally perpendicular thereto, an arm fixed to said rockshaft extending under said trough, a second arm at the opposite end of said rockshaft, and a spring connected to said second arm and anchored to said unit, said spring acting through said rockshaft and arm tending to swing said trough from a normally horizontal operating position to a substantially vertical inoperative position alongside said unit to provide for passage of a wagon or the like into position adjacent said blower.

5. An implement for elevating silage and like material, comprising a power-driven elevating unit including a housing, a blower wheel within said housing, a feed opening in said housing at one side of the axis of said blower wheel, said opening extending from below the horizontal plane of the blower shaft to a point directly above the axis of the blower shaft, drive means for rotating said blower wheel downwardly past said feed opening, a feed conveyor pivotally mounted on said elevating unit for receiving material to be elevated and delivering it to said elevating unit, said conveyor comprising a trough, hinge means for connecting said trough to said elevating unit, an auger in said trough, said auger supported at its outer end in a bearing carried in the outer end of said trough, the inner end of said auger resting in said trough, a power shaft for driving the auger extending longitudinally of, and mounted on said trough, the outer end of said power shaft being connected with the outer end of said auger and the inner end flexibly connected with said drive means and adapted to rotate said auger in the direction opposite to that of said wheel, said trough being swingable from a normally horizontal operating position to a substantially vertical inoperative position alongside said blower to provide for the passage of a wagon or the like into position adjacent said blower.

6. An implement for elevating silage and like material, comprising a blower, an auger conveyor for receiving material to be elevated and delivering it to said blower, and a counterbalancing means mounted on said blower comprising a rockshaft disposed longitudinally of said blower, an arm on the front end of said rockshaft, a spring connected to said arm and to a point on said blower, a second arm on the opposite end of said rockshaft extending laterally beneath said conveyor, and a roller on the outer end of said second arm to engage the lower face of said conveyor.

7. An implement for elevating silage and like material, comprising a blower, an auger conveyor for receiving material to be elevated and delivering it to said blower, and a counterbalancing means mounted on said blower comprising a rockshaft disposed longitudinally of said blower, an arm on the front end of said rockshaft, a spring connected to said arm and to a point on said blower, a second arm on the opposite end of said rockshaft disposed at an angle to the first mentioned arm and engaging said auger conveyor.

8. An implement of the class described, comprising a housing, a blower wheel within said housing and rotatable in one direction, said housing having a generally kidney-shaped feed opening in one side wall, said opening curving about the axis of said blower wheel, and a feed conveyor including an auger rotatable about an axis substantially parallel to the axis of said wheel, in a direction of rotation opposite to that of said wheel, said auger being disposed at that end of said opening toward which said wheel moves as it traverses the opening.

9. An implement of the class described, comprising a housing, a blower wheel within said housing, said housing having a generally kidney-shaped feed opening in one side wall at one side of the axis of said wheel, said opening curving about the axis of the blower wheel shaft from below the horizontal plane of the latter to a point directly above said axis, drive means for rotating said blower wheel downwardly past said feed opening, a feed auger disposed generally parallel to the axis of said wheel and positioned to deliver material into the lower portion of said feed opening, and drive means for rotating said auger in the direction opposite to that of said wheel.

10. An implement of the class described, comprising a housing, a blower wheel within said housing, said housing having a generally kidney-shaped feed opening in one side wall at one side of the axis of said wheel, said opening curving about the axis of the blower wheel shaft from below the horizontal plane of the latter to a point directly above said axis, a feed conveyor comprising a trough positioned at the lower end of said opening, an auger in said trough, said auger being supported at its outer end in a bearing carried in the outer end of said trough, the inner end of said auger resting in said trough, and a stripper on one side of the trough and overhanging said auger to limit the upward movement of the latter out of said trough.

11. An implement of the class described, comprising a housing, a blower wheel within said housing and rotatable in one direction, said housing having a generally kidney-shaped feed opening in one side wall, said opening curving about the axis of said blower wheel, and a feed conveyor including a trough positioned at that end of said opening toward which said wheel moves as it traverses said opening, an auger rotatable about an axis generally parallel to the axis of said wheel, in a direction of rotation opposite to that of said wheel, said auger being supported at its outer end in a bearing carried in the outer end of said trough, the inner end of said auger resting in said trough, and a stripper on one side of the trough and overhanging said auger to limit the upward movement of the latter out of said trough.

12. An implement of the class described, comprising a housing, a blower wheel within said housing, a shaft for said wheel, a bearing mounted on a side wall of said housing, there being a feed opening in said side wall below and at one side of said bearing, a feed trough of substantially the same width as the lower portion of said opening disposed with its sides and bottom substantially in register with the side and lower edges of said opening, the side edges of said opening curving upwardly about said bearing at one side thereof defining a kidney-shaped opening terminating over said bearing, a feed auger in said trough of substantially the same width as the latter, and means for rotating said auger in the same direction as the direction of upward curvature of the side edges of said opening.

13. The combination set forth in claim 12 with the further provision of means for rotating said auger in the same direction as the direction of upward curvature of the side edges of said opening, and means for rotating said blower wheel in the opposite direction.

14. An implement for elevating silage and like material, comprising a blower and a feed conveyor for receiving material and delivering it to said blower, said feed conveyor comprising a trough pivotally mounted on said blower and extending outwardly laterally therefrom, an auger in said trough, said auger supported at its outer end in a bearing carried in the outer end of said trough, the inner end of said auger resting in said trough and supported therein on the edge of the auger blade, said auger being adapted for a limited amount of upward movement relative to said trough as the auger is displaced upwardly by material in said trough, and a stripper fixed along one side of said trough and overhanging said auger, to cooperate with the latter in feeding the material and to limit the upward movement of said auger, counterbalancing means on said blower and cooperating with said trough to swing said trough from a normally horizontal position to a substantially vertical position alongside said blower to provide for the passage of a wagon or the like into position adjacent said blower, a power shaft extending longitudinally of said trough and journaled in spaced bearings fixed thereto, means connecting the outer end of said shaft with the outer end of said auger, and means including a pair of telescoping shafts having a pair of universal joints at opposite ends thereof, respectively, for connecting said power shaft on said trough with said blower and accommodating swinging movement of said trough.

WILBUR J. COULTAS.
ELLSWORTH T. JOHNSON.
JESSE A. WALKER.